(12) United States Patent
Imai et al.

(10) Patent No.: US 9,836,978 B2
(45) Date of Patent: Dec. 5, 2017

(54) PARKING ASSISTANCE DEVICE

(71) Applicant: AISIN SEIKI KABUSHIKI KAISHA, Kariya-shi, Aichi-ken (JP)

(72) Inventors: Norio Imai, Anjo (JP); Masaya Kato, Toyokawa (JP); Yusuke Kiyokawa, Toyota (JP); Motokatsu Tomozawa, Nagoya (JP)

(73) Assignee: AISIN SEIKI KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 15/223,245

(22) Filed: Jul. 29, 2016

(65) Prior Publication Data

US 2017/0032680 A1 Feb. 2, 2017

(30) Foreign Application Priority Data

Jul. 31, 2015 (JP) .................. 2015-151615

(51) Int. Cl.

| G08G 1/16 | (2006.01) |
|---|---|
| H04L 29/08 | (2006.01) |
| B62D 15/02 | (2006.01) |
| G01C 21/34 | (2006.01) |
| G01C 21/36 | (2006.01) |

(Continued)

(52) U.S. Cl.
CPC ............ *G08G 1/168* (2013.01); *B60Q 9/008* (2013.01); *B62D 15/028* (2013.01); *G01C 21/3407* (2013.01); *G01C 21/3629* (2013.01); *G01C 21/3647* (2013.01); *G06K 9/00798* (2013.01); *G06K 9/00805* (2013.01); *G06K 9/6293* (2013.01); *H04L 67/12* (2013.01)

(58) Field of Classification Search
None
See application file for complete search history.

(56) References Cited

U.S. PATENT DOCUMENTS 8,560,169 B2* 10/2013 Sasajima .................. G08G 1/14
340/932.2
9,475,492 B2* 10/2016 Okano ..................... H04N 7/18
(Continued)

FOREIGN PATENT DOCUMENTS

| CN | 104661880 A | 5/2015 |
|---|---|---|
| JP | 2013-203348 A | 10/2013 |

OTHER PUBLICATIONS

Communication dated Dec. 14, 2016, from the European Patent Office in counterpart European application No. 16178145.5.

*Primary Examiner* — Krishnan Ramesh
(74) *Attorney, Agent, or Firm* — Sughrue Mion, PLLC (57) ABSTRACT

A parking assistance device includes: an acquisition unit that acquires a first distance between a vehicle and a first obstacle measured by a distance measuring unit and a second distance between the vehicle and a second obstacle measured by the distance measuring unit; a calculation unit that calculates an inter-objects distance between the first and second obstacles; and a generation unit that generates a guidance route for the vehicle such that each of the first and second distances become equal to or longer than a second reference distance which is shorter than a first reference distance that is a reference for safe travelling of the vehicle, when the vehicle is caused to move between the first and second obstacles and within the inter-objects distance and in a case where a condition is satisfied.

5 Claims, 9 Drawing Sheets (51) Int. Cl.
 B60Q 9/00 (2006.01)
 G06K 9/00 (2006.01)
 G06K 9/62 (2006.01)

(56) References Cited

U.S. PATENT DOCUMENTS

| | | | |
|---|---|---|---|
| 2010/0274446 A1* | 10/2010 | Sasajima | G08G 1/14 701/36 |
| 2012/0221207 A1* | 8/2012 | Nakamura | G01C 21/3407 701/41 |
| 2015/0254981 A1 | 9/2015 | Tachibana et al. | |
| 2015/0258989 A1* | 9/2015 | Okano | H04N 7/18 701/1 |

* cited by examiner

PARKING ASSISTANCE DEVICE

CROSS REFERENCE TO RELATED APPLICATIONS

This application is based on and claims priority under 35 U.S.C. §119 to Japanese Patent Application 2015-151615, filed on Jul. 31, 2015, the entire contents of which are incorporated herein by reference.

TECHNICAL FIELD

An embodiment of this disclosure relates to a parking assistance device.

BACKGROUND DISCUSSION

In the related art, a technology has been proposed, in which a vehicle is guided to a target position. When the vehicle is guided to the target position, a guidance route to the target position is generated while a positional relationship between the vehicle and an obstacle is being considered, and then, the vehicle is controlled such that the vehicle moves in accordance with the guidance route.

When the guidance route is generated, the guidance route is generated in such a manner that the vehicle and the obstacle are separated from each other by equal to or longer than a certain margin distance, and thus, the vehicle and the obstacle are suppressed from coming in contact with each other.

JP2013-203348A is an example of the related art.

However, in the related art, in a case where the vehicle moves through a narrow space between the obstacles, there is a case where the guidance route cannot be generated if the obstacle and the vehicle are intended to be separated from each other by equal to or longer than the certain margin distance.

SUMMARY

A parking assistance device according to an embodiment includes: for example, an acquisition unit that acquires a first distance between a vehicle and a first obstacle measured by a distance measuring unit and a second distance between the vehicle and a second obstacle measured by the distance measuring unit; a calculation unit that calculates an inter-objects distance between the first obstacle and the second obstacle; and a generation unit that generates a guidance route for the vehicle such that each of the first distance and the second distance acquired by the acquisition unit become equal to or longer than a second reference distance which is shorter than a first reference distance that is a reference for safe travelling of the vehicle, when the vehicle is caused to move between the first obstacle and the second obstacle and within the inter-objects distance and in a case where a condition is satisfied.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment will be disclosed herein. Configurations in the embodiment described hereinafter and actions, results and effects brought by the configuration are merely examples. This disclosure can also be realized by a configuration other than that disclosed in the embodiment described hereinafter, and at least one of various effects and derivative effects based on the basic configuration can be obtained.

In the present embodiment, a vehicle 1 may be, for example, an automobile of which a drive source is an internal combustion engine (not illustrated), that is, an internal combustion engine vehicle, may be an automobile of which the drive source is an electric motor (not illustrated), that is, an electric vehicle, fuel-cell vehicle or the like, may be a hybrid vehicle of which a drive source is both the internal combustion engine and the electric motor, or may be a vehicle having another drive source. In addition, the vehicle 1 can mount various transmissions, or can mount various devices such as a system or components necessary for driving the internal combustion engine and the electric motor. In addition, a device, a method, the number, a layout relating to driving of vehicle wheels 3 of the vehicle 1 can be set variously.

Figure 1:
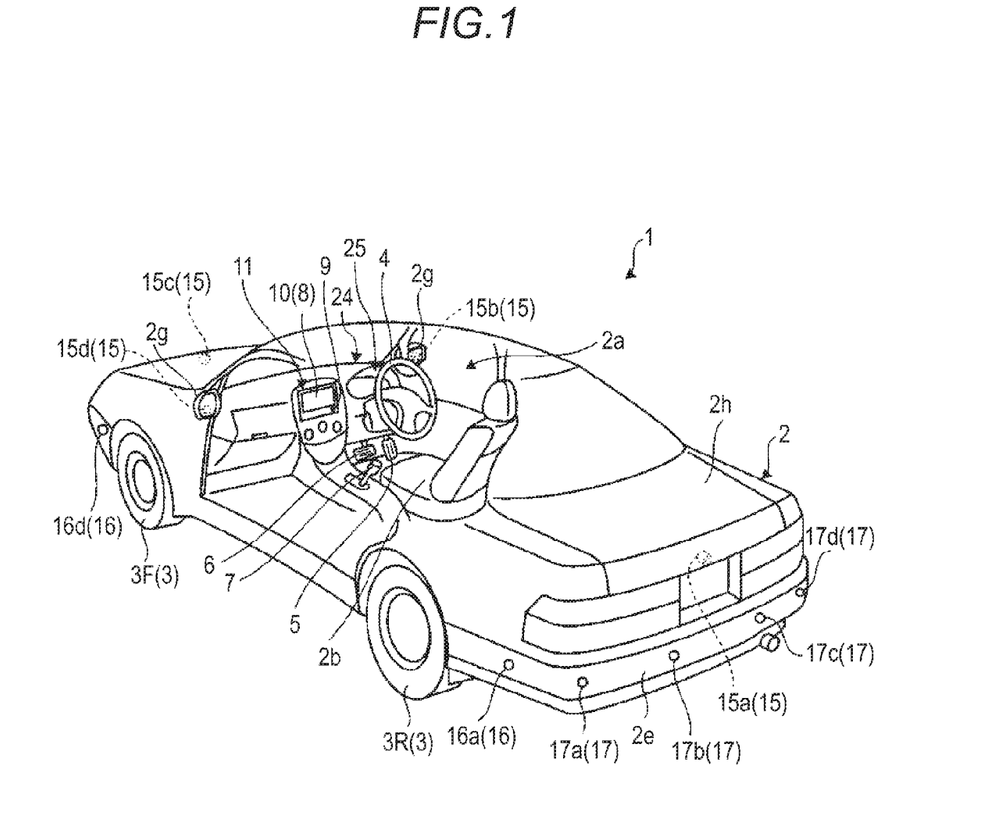
FIG. 1 is an exemplary perspective view illustrating a state in which a part of a passenger compartment of a vehicle in an embodiment is seen.

As illustrated in FIG. 1, a vehicle body 2 configures a passenger compartment 2a in which occupants (not illustrated) are seated. In the passenger compartment 2a, a steering section 4, an acceleration operation section 5, a brake operation section 6, and a shift operation section 7 are provided in a state of facing a seat 2b of a driver as the occupant. The steering section 4 is, for example, a steering wheel protruded from a dashboard 24, the acceleration operation section 5 is, for example, an accelerator pedal positioned under a foot of the driver, the brake operation section 6 is, for example, a brake pedal positioned under the foot of the driver, and the shift operation section 7 is, for example, a shift lever protruding from a center console. The steering section 4, the acceleration operation section 5, the brake operation section 6, and the shift operation section 7 are not limited to those described above.

In addition, a display device 8 as a display output unit and a voice output device 9 as a voice output unit are provided in the passenger compartment 2$a$. The display device 8 is, for example, a liquid crystal display (LCD), an organic electro luminescent display (OLED), or the like. The voice output device 9 is, for example, a speaker. In addition, the display device 8 is covered by a transparent operation input unit 10 such as a touch panel. The occupants can visually recognize an image displayed on a display screen of the display device 8 via the operation input unit 10. In addition, the occupants can execute an operation input by operations such as touching, pressing or moving the operation input unit 10 by a finger on a position corresponding to the image displayed on the display screen of the display device 8. The display device 8, the voice output device 9, and the operation input unit 10 are provided on a monitor device 11 positioned on the dashboard 24 at a center portion in a vehicle width direction, that is, a horizontal direction. The monitor device 11 can include an operation input unit (not illustrated) such as a switch, a dial, a joystick, a press button, or the like. In addition, a voice output device (not illustrated) can be provided at another position in the passenger compartment 2$a$ that is different from the position of the monitor device 11, or the voice can be output from another voice output device that is different from the voice output device 9 of the monitor device 11. The monitor device 11 is also used as, for example, a navigation system or an audio system.

Figure 2:
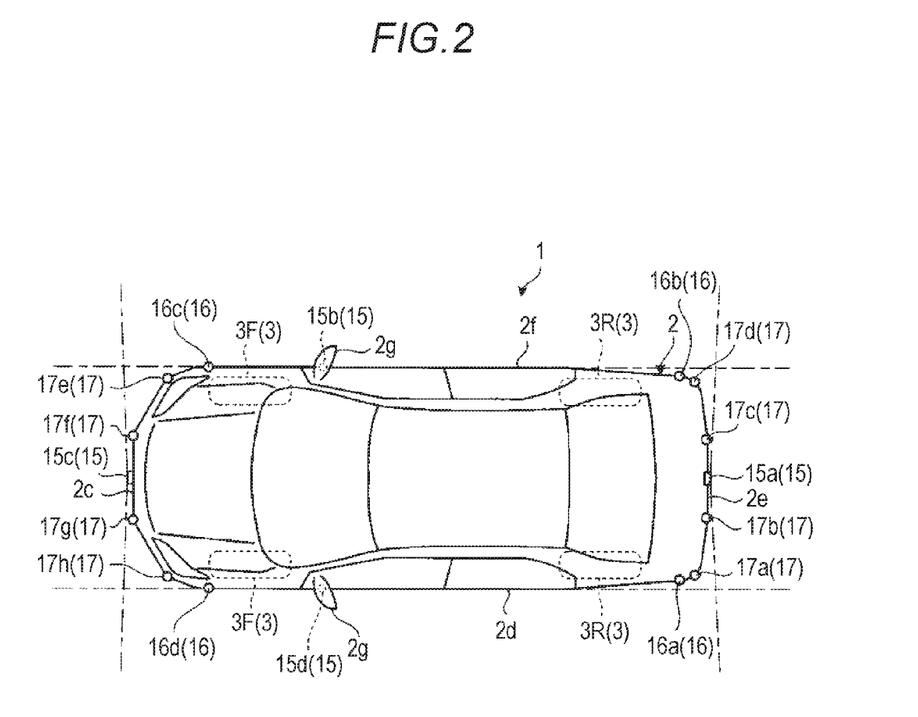
FIG. 2 is an exemplary plan view (overhead view) illustrating the vehicle in the embodiment.
Figure 3:
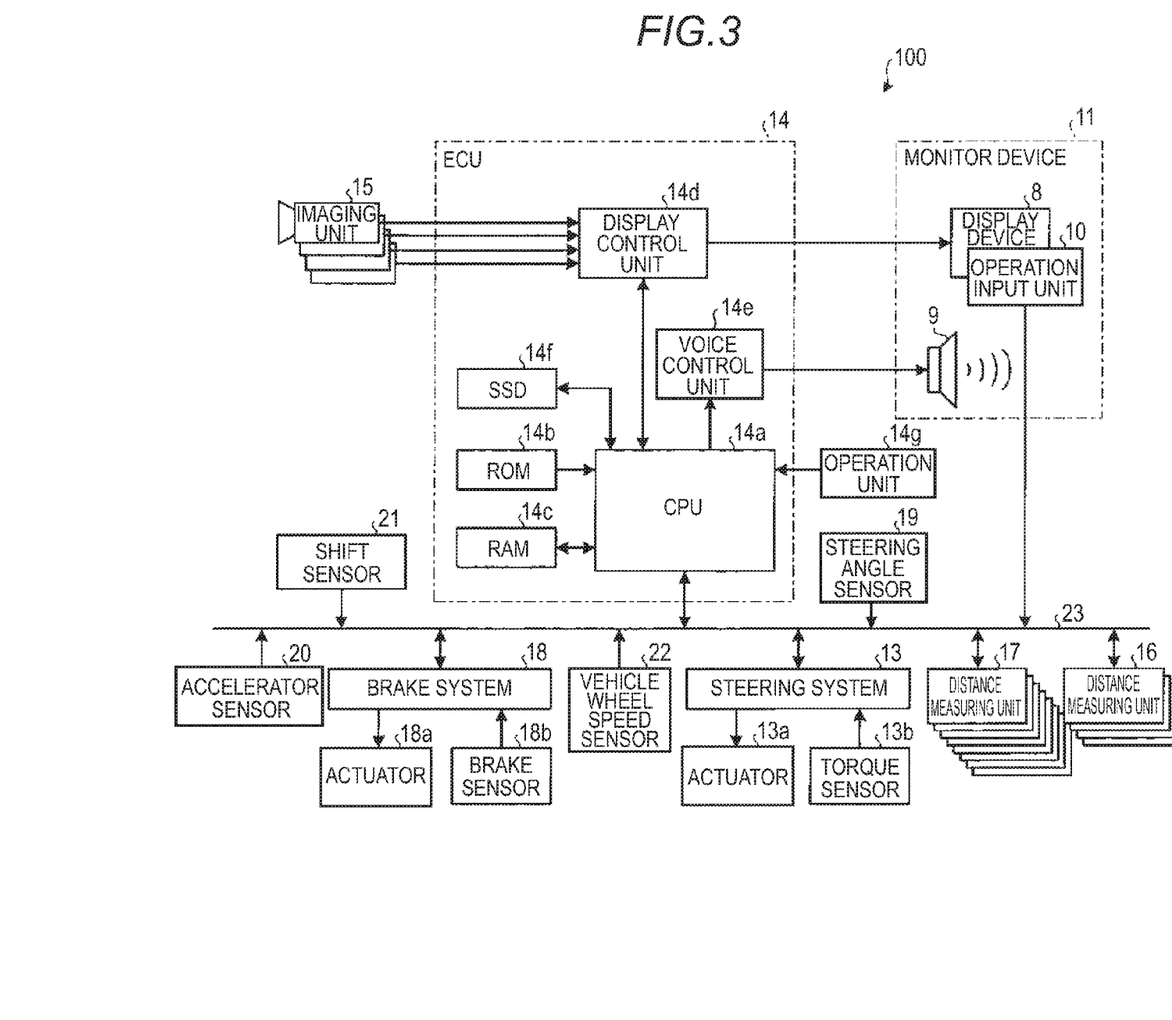
FIG. 3 is an exemplary block diagram illustrating a configuration of a parking assistance system in the embodiment.

In addition, as illustrated in FIG. 1 and FIG. 2, the vehicle 1 is a four wheel vehicle, and includes right and left front wheels 3F and right and left rear wheels 3R. Any of these four vehicle wheels 3 are configured so as to be steered. As illustrated in FIG. 3, the vehicle 1 includes a steering system 13 that steers at least two vehicle wheels 3. The steering system 13 includes an actuator 13$a$ and a torque sensor 13$b$. The steering system 13 is electrically controlled by an electronic control unit (ECU) 14 or the like, and operates the actuator 13$a$. The steering system 13 is, for example, an electric power steering system, a steer by wire (SBW) system, or the like. The steering system 13 supplements a steering force by adding torque, that is, assisted torque to the steering section 4 using the actuator 13$a$ or steers the vehicle wheels 3 using the actuator 13$a$. In this case, the actuator 13$a$ may steer one vehicle wheel 3 or may steer a plurality of vehicle wheels 3. In addition, the torque sensor 13$b$ detects, for example, a torque applied to the steering section 4 from the user.

In addition, as illustrated in FIG. 2, for example, four imaging units 15$a$ to 15$d$ are provided on the vehicle body 2 as a plurality of imaging units 15. The imaging unit 15 is a digital camera in which an imaging element such as a charge coupled device (CCD) or a CMOS image sensor (CIS) is incorporated. The imaging unit 15 can output moving picture data in a predetermined frame rate. The imaging unit 15 respectively includes a wide-angle lens and a fish-eye lens and can image a range of, for example, 140° to 190° in the horizontal direction. In addition, an optical axis of the imaging unit 15 is set obliquely downward. Accordingly, the imaging unit 15 sequentially images an external environment around the vehicle body 2 including a road surface where the vehicle 1 can move or an area where the vehicle 1 can park, and outputs the image as imaged image data.

The imaging unit 15$a$ is positioned, for example, at an end portion 2$e$ on the rear side of the vehicle body 2 and is provided on a wall portion at a lower side of a door 2$h$ of a rear trunk. The imaging unit 15$b$ is positioned, for example, at an end portion 2$f$ on the right side of the vehicle body 2 and is provided on a right side rear view mirror 2$g$. The imaging unit 15$c$ is positioned, for example, at an end portion 2$c$ on the front side, that is, the front side in the longitudinal direction of the vehicle body 2 and is provided on a front bumper or the like. The imaging unit 15$d$ is positioned, for example, at an end portion 2$d$ on the left side, that is, the left side in the vehicle width direction of the vehicle body 2 and is provided on a rear view mirror 2$g$ as a left side protrusion portion. The ECU 14 executes calculation processing and image processing based on the image data obtained from the plurality of imaging units 15, and then, can generate an image of a wide viewing angle or generate a virtual bird's-eye view image viewed from above the vehicle 1. The bird's-eye view image is referred to as a plane image.

In addition, the ECU 14 identifies partition lines or the like indicated on the road surface around the vehicle 1 from the image imaged by the imaging unit 15, and detects (extracts) a parking section indicated by the partition lines.

In addition, as illustrated in FIG. 1 and FIG. 2, for example, four distance measuring units 16$a$ to 16$d$ and eight distance measuring units 17$a$ to 17$h$ are provided on the vehicle body 2 as a plurality of distance measuring units 16 and 17. The distance measuring units 16 and 17 are, for example, sonar items that emit ultrasonic wave and catch reflected wave. The sonar is also referred to as a sonar sensor, an ultrasonic detector, or ultrasonic sonar. The ECU 14 can identify the presence of the object such as the obstacle or the like positioned around the vehicle 1 and can measure the distance to the object according to the result of detection by the distance measuring units 16 and 17. That is, the distance measuring units 16 and 17 is an example of the detection unit that detect the object. The distance measuring unit 17 is used for detecting, for example, an object of relatively short distance, and the distance measuring unit 16 is used for detecting, for example, an object of relatively longer distance than the distance measuring unit 17. In addition, the distance measuring unit 17 is used for detecting an object at the front and rear of the vehicle 1, and the distance measuring unit 16 is used for detecting an object at the sides of the vehicle 1. In addition, the distance measuring units 16 and 17 may be radar apparatus.

In addition, as illustrated in FIG. 3, in a parking assistance system 100, a brake system 18, a steering angle sensor 19, an accelerator sensor 20, a shift sensor 21, and a vehicle wheel speed sensor 22 are electrically connected to each other via an in-vehicle network 23 as a telecommunication line in addition to the ECU 14, the monitor device 11, the steering system 13, and the distance measuring units 16 and 17. The in-vehicle network 23 is configured, for example, as a controller area network (CAN). The ECU 14 can control the steering system 13, brake system 18, or the like by sending a control signal via the in-vehicle network 23. In addition, the ECU 14 can receive the result of detection by the torque sensor 13$b$, the brake sensor 18$b$, the steering angle sensor 19, the distance measuring unit 16, the distance measuring unit 17, the accelerator sensor 20, the shift sensor 21, the vehicle wheel speed sensor 22, and the like, or an operation signal of the operation input unit 10 via the in-vehicle network 23.

The ECU 14 includes, for example, a central processing unit (CPU) 14$a$, a read only memory (ROM) 14$b$, a random access memory (RAM) 14$c$, a display control unit 14$d$, voice control unit 14$e$, a solid state drive (SSD) 14$f$ (flash memory), or the like. The CPU 14$a$ can execute various calculation processing and control such as image processing relating to the image displayed on the display device 8, determination of a moving target position of the vehicle 1, calculation of the moving route of the vehicle 1, determination of a presence or absence of the interference with the object, an automatic control of the vehicle 1, release of the automatic control, and the like. The CPU 14a can read out a program installed and stored in a non-volatile storage device such as the ROM 14b, and can execute the calculation processing according to the program. The RAM 14c temporarily stores various data used for the calculation by the CPU 14a. In addition, the display control unit 14d mainly executes the image processing using the image data obtained by the imaging unit 15 and the composition of the image data to be displayed on the display device 8 among the calculation processing items in the ECU 14. In addition, the voice control unit 14e mainly executes processing of the voice data output from the voice output device 9 among the calculation processing items in the ECU 14. In addition, the SSD 14f is a rewritable non-volatile storage unit, and can store data even in a case where the power of the ECU 14 is turned off. The CPU 14a, ROM 14b, RAM 14c, and like are integrated in one package. In addition, the ECU 14 may be configured to use another logical operation processor or a logic circuit such as a digital signal processor (DSP) or the like instead of the CPU 14a. In addition, a hard disk drive (HDD) may be provided instead of the SSD 14f, and the SSD 14f and the HDD may be provided separate from the ECU 14. The ECU 14 is an example of the parking assistance device.

The brake system 18 is, for example, an anti-lock brake system (ABS) that suppresses locking of the brake, an electronic stability control (ESC) that suppresses skidding of the vehicle 1 at the time of cornering, an electric brake system that enhances the braking force (executes a braking assist), a brake by wire (BBW), and the like. The brake system 18 gives a braking force to the vehicle wheels 3, and eventually to the vehicle 1 via the actuator 18a. In addition, the brake system 18 can detect locking of the brake, idling of the vehicle wheels 3, or signs of skidding from the rotation difference between the right and left vehicle wheels 3, and can execute various controls. A brake sensor 18b is, for example, a sensor that detects a position of a movable portion of the brake operation section 6. The brake sensor 18b can detect the position of the brake pedal as the movable portion. The brake sensor 18b includes a displacement sensor.

The steering angle sensor 19 is a sensor that detects an amount of steering of the steering section 4 such as the steering wheel. The steering angle sensor 19 is configured using, for example, a hall element or the like. The ECU 14 acquires the amount of steering of the steering section 4 by the user or an amount of steering of each vehicle wheel 3 in a case of automatic steering from the steering angle sensor 19, and executes various controls. The steering angle sensor 19 detects a rotation angle of a rotating part included in the steering section 4. The steering angle sensor 19 is an example of an angle sensor.

The accelerator sensor 20 is, for example, a sensor that detects a position of a movable portion of the acceleration operation section 5. The accelerator sensor 20 can detect the position of the accelerator pedal as the movable portion. The accelerator sensor 20 includes a displacement sensor.

The shift sensor 21 is, for example, a sensor that detects a position of a movable portion of the shift operation section 7. The shift sensor 21 can detect a position of a lever, an arm, a button, or the like as the movable portion. The shift sensor 21 may include a displacement sensor or may be configured as a switch.

The vehicle wheel speed sensor 22 is a sensor that detects an amount of rotation or the number of rotations of the vehicle wheels 3 per unit time. The vehicle wheel speed sensor 22 outputs the number of the vehicle wheel speed pulses indicating the detected number of rotations as a sensor value. The vehicle wheel speed sensor 22 is configured using, for example, the hall element or the like. The ECU 14 calculates an amount of movement of the vehicle 1 based on the sensor value acquired from the vehicle wheel speed sensor 22, and executes various controls. In some cases, the vehicle wheel speed sensor 22 is provided on the brake system 18. In this case, the ECU 14 acquires the result of detection by the vehicle wheel speed sensor 22 via the brake system 18.

The configuration, the arrangement, the electrical connection form of various sensors and the actuator described above are just examples, and can be variously set (changed).

Figure 4:
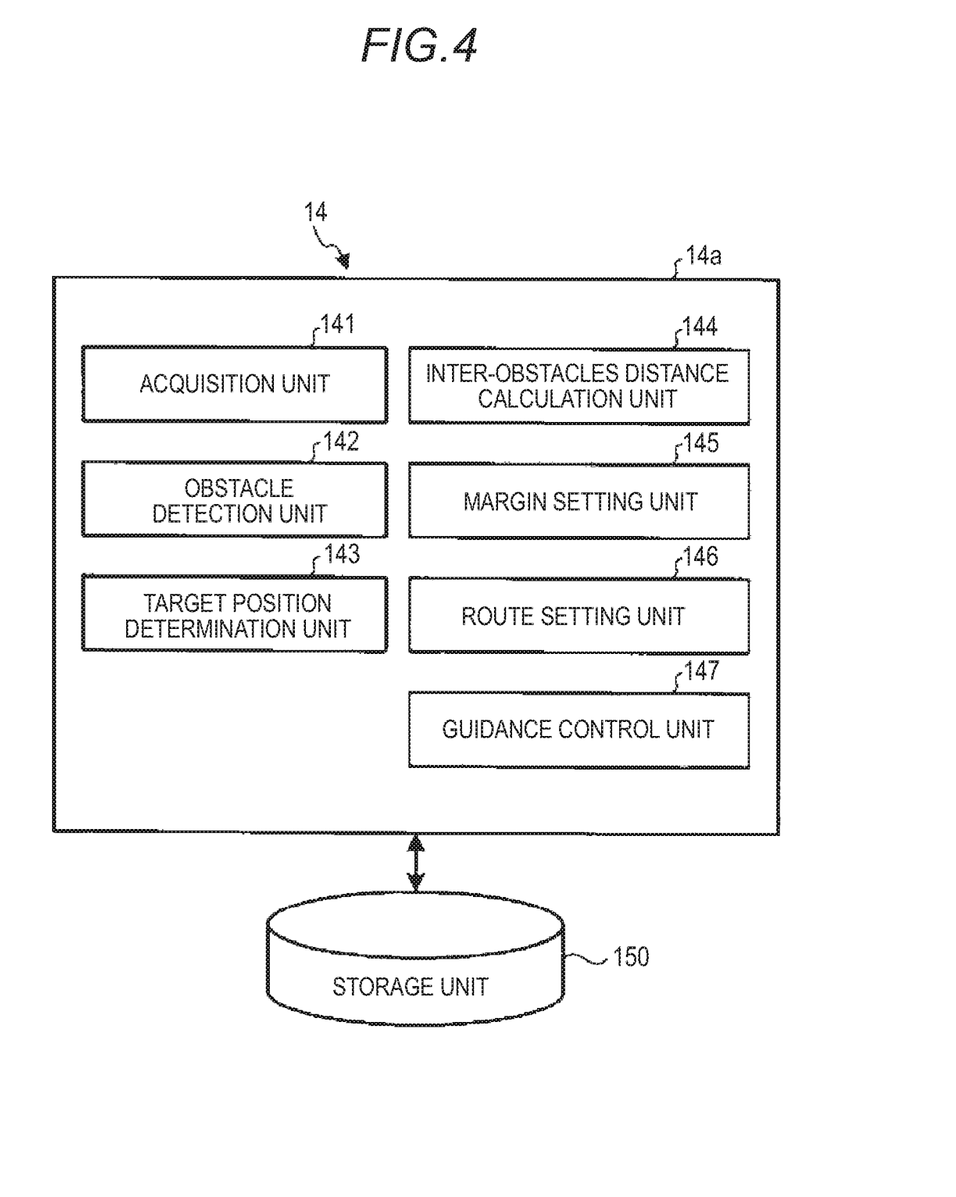
FIG. 4 is an exemplary block diagram illustrating a configuration of a part of an ECU (a parking assistance device) of the parking assistance system in the embodiment.

As illustrated in FIG. 4, the ECU 14 includes an acquisition unit 141, an obstacle detection unit 142, a target position determination unit 143, an inter-obstacles distance calculation unit 144, a margin setting unit 145, a route setting unit 146, a guidance control unit 147, a storage unit 150, and the like. For example, the CPU 14a functions as the acquisition unit 141, the obstacle detection unit 142, the target position determination unit 143, the inter-obstacles distance calculation unit 144, margin setting unit 145, the route setting unit 146, the guidance control unit 147, and the like by executing processing in a accordance with a program. In addition, data items used in calculation processing in each unit and data of results of the calculation processing are stored in the storage unit 150. At least a part of the functions of each unit described above may be realized by hardware.

The acquisition unit 141 acquires various data and signals. The acquisition unit 141 acquires, for example, results of detection by each sensor and data or signals such as an operation input, instruction input, image data or the like. The acquisition unit 141 can acquire a signal by an operation input of an operation unit 14g. The operation unit 14g is, for example, a push-button or a switch.

As another example, as the result of detection by each sensor, the acquisition unit 141 acquires distance information which indicates a distance between a vehicle 1 and an obstacle measured by a plurality of distance measuring units 16 and 17. In addition, in a case where there is a plurality of obstacles, the acquisition unit 141 acquires one distance (that corresponds to the first distance) between the vehicle 1 and one obstacle measured by the plurality of distance measuring units 16 and 17 and the other distance (that corresponds to the second distance) between the vehicle 1 and the other obstacle measured by the plurality of distance measuring units 16 and 17. In addition, the acquisition unit 141 acquires image information captured by the imaging unit 15. The distance information between the obstacles and the image information are continuously acquired while the vehicle 1 is started.

The obstacle detection unit 142 detects obstacles causing troubles in travelling of the vehicle 1 based on the distance information and the image information acquired by the acquisition unit 141. The obstacles are, for example, another vehicle, walls, columns, fences, protrusions, steps, wheel stoppers, objects, or the like. The obstacle detection unit 142 can detect a presence or absence, a height, a size, and the like of the obstacle using various methods.

In addition, the obstacle detection unit 142 may detect the presence or absence and the height of the obstacle based on a result of detection by the vehicle wheel speed sensor 22 or an acceleration sensor (not illustrated) and a result of detection by the distance measuring units 16 and 17. In addition, the obstacle detection unit 142 may detect the height of the obstacle by the image processing based on the image captured by the imaging unit 15.

The target position determination unit 143 determines a target position based on the various data and the signals acquired by the acquisition unit 141, which is a position for a guide line or a target in guiding the vehicle 1. The target position may be an end point of the moving route or may be in the middle of the moving route. The target position may be set as, for example, a point, a line, a frame, a region, or the like. For example, the target position determination unit 143 may determine the target position based on the result of detection by the obstacle detection unit 142.

In a case where a plurality of obstacles is present between the current position of the vehicle 1 and the target position determined by the target position determination unit 143, the inter-obstacles distance calculation unit 144 calculates a distance between the plurality of obstacles.

Figure 5:
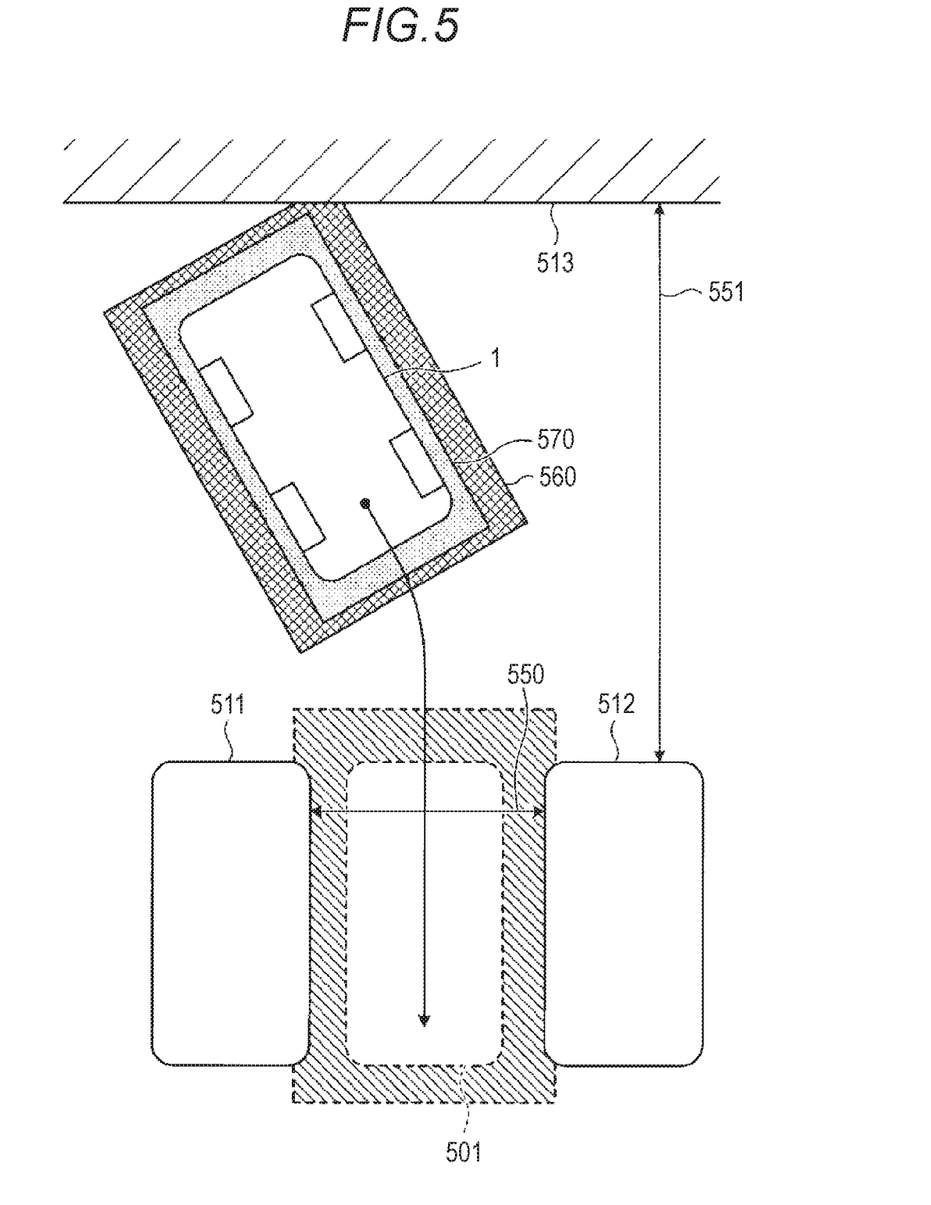
FIG. 5 is a conceptual diagram illustrating a positional relationship between the vehicle and an obstacle in a case where the vehicle in the embodiment is parked side-by-side.

FIG. 5 is a conceptual diagram illustrating a positional relationship between the vehicle 1 and an obstacle in a case where the vehicle 1 in the embodiment is parked in side-by-side. FIG. 5 illustrates the positional relationship when the vehicle 1 is parked at a target position 501. In this case, it assumed that the obstacles are other vehicles 511 and 512 that are present on both sides of the target position 501 and a fence or a wall 513 that restricts the road width for the vehicle 1.

Then, the inter-obstacles distance calculation unit 144 calculates a distance 550 indicating a distance between the vehicle 511 and the vehicle 512 and calculates a distance 551 indicating the road width formed from the vehicles 511 and 512 and the fence or wall 513.

The margin setting unit 145 sets a safety margin which is a reference for separating the vehicle 1 from the obstacle in order for setting the guidance route for the vehicle 1. As a reference when the vehicle 1 safely travels, the safety margin in the present embodiment is defined as a distance (hereinafter, referred to as a reference distance) from the surface of the vehicle 1. In this way, a guidance route is generated such that the obstacle is not included within a range of the reference distance from the surface (for example, a front surface, a rear surface, and side surfaces) of the vehicle 1 which is indicated as the safety margin. In this way, the vehicle 1 and the obstacle are suppressed from being in contact with each other. A normal reference distance in the present embodiment is, for example, 300 mm, but may be a distance other than that distance.

The route setting unit 146 in the present embodiment sets the guidance route using a known method in such a manner that, for example, the obstacle which is present between the current position of the vehicle 1 and the target position is not included within the range indicated by the safety margin.

As described above, the route setting unit 146 in the present embodiment generates the guidance route for the vehicle 1 in such a manner that the information of distance to the obstacle acquired by the acquisition unit 141 indicates equal to or longer than a first reference distance (for example, 300 mm) indicated as the safety margin.

However, in a case where the safety margin is set to 300 mm, if an interval is not spaced, which is obtained by adding 600 mm to the width of the vehicle 1, the guidance route for the vehicle 1 cannot be set. In this case, when the vehicle 1 is guided to the target position by the automatic driving, it can be considered that the vehicle 1 cannot pass despite that there is a space through which the vehicle 1 can pass.

Therefore, when a plurality of obstacles is present in the route to the target position and the vehicle 1 moves between the plurality of obstacles, and in a case where a condition is satisfied, the route setting unit 146 in the present embodiment generates the guidance route for the vehicle 1 in such a manner that distances (for example, corresponding to distances to one obstacle and the other obstacle) to each of the plurality of obstacle obstacles acquired by the acquisition unit 141 becomes equal to or longer than a second reference distance (for example, 200 mm) which is shorter than the first reference distance (for example, 300 mm). In a case of not moving the vehicle 1 between the plurality of obstacles or in a case where the condition is not satisfied, the route setting unit 146 generates the guidance route for the vehicle 1 in such a manner that the distance to the obstacle becomes equal to or longer than the first reference distance.

In the example illustrated in FIG. 5, the first safety margin 560 is set as a first safety margin of the vehicle 1. Then, a width of the first safety margin 560 in a case where the vehicle 1 moves to the target position 501 becomes longer than the distance 550 between the vehicle 511 and the vehicle 512. Therefore, with this first safety margin, it is difficult to perform the automatic guidance for the vehicle 1 to the target position 501.

Therefore, in the present embodiment, in a case where a predetermined condition is satisfied, the safety margin of the vehicle 1 is controlled to be short. In the present embodiment, the predetermined conditions are a case where the vehicle 1 passes through the interval narrower than the width of the first safety margin 560 and a case where the vehicle 1 moves at a speed equal to or lower than a predetermined speed by the parking assistance control or the like when the vehicle 1 moves to the target position 501. In the present embodiment, two cases are satisfied as the predetermined condition. However, any one of the cases may be satisfied, among the two cases of passing through the narrow interval and of moving at the speed equal to or lower than the predetermined speed.

The condition that the margin setting unit 145 changes the safety margin to be narrow in the present embodiment is a case where a difference of the distance between the obstacles and the length of the vehicle in the direction connecting the obstacles at the time when the vehicle 1 moves between the obstacles is equal to or shorter than a preset threshold value, and a case where the vehicle 1 is creeping. The preset threshold value is assumed to be a value appropriately set according to the embodiments.

In the example illustrated in FIG. 5, in a case where the conditions for changing are satisfied, the margin setting unit 145 changes the safety margin from the first safety margin 560 to a second safety margin 570.

The second safety margin 570 in the present embodiment is set in such a manner that the information of the distance from any one or more of the front surface and the rear surface of the vehicle 1 to the obstacle indicates equal to or longer than the second reference distance (for example, 200 mm) and the information of the distance from the side surface of the vehicle 1 to the obstacle indicates equal to or longer than a third reference distance (for example, 100 mm). The example in the present embodiment, the second reference distance from the front surface and the rear surface and the third reference distance from the side surface are described as being different from each other. However, appropriate reference distances may be set for each surface.

Since the width of the second safety margin 570 becomes shorter than the distance 550 between the vehicle 511 and the vehicle 512 due to the change, the route setting unit 146 can set the guidance route to the target position 501. In addition, since the reference distance of the vehicle 1 in the front surface direction is short, it is possible to easily generate the guidance route in such a manner that the safety margin 570 does not overlap the fence or wall 513.

The margin setting unit 145 in the present embodiment sets the appropriate reference distance with respect to each of the front surface, rear surface, and the side surfaces of the vehicle 1 as the safety margin. Then, the route setting unit 146 sets the guidance route for the vehicle 1 in such a manner that the distance to the obstacle becomes equal to or longer than the second reference distance (200 mm) with regard to any one or more of the front surface and the rear surface of the vehicle 1, and the distance to the obstacle becomes equal to longer than the third reference distance (100 mm) with regard to the side surfaces of the vehicle 1.

In addition, in the present embodiment, in a case of changing the safety margin, it is not limited to change the safety margin from the first reference distance (300 mm) to the second reference distance (200 mm) and the third reference distance (100 mm). The reference distance may be gradually changed according to the distance between the obstacles.

Figure 6:
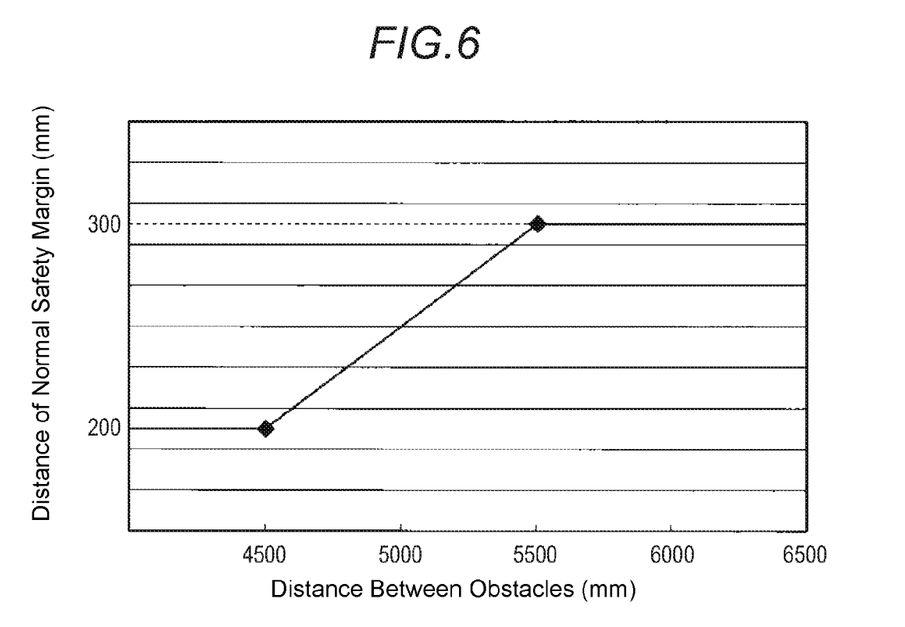
FIG. 6 is an exemplary diagram illustrating a distance relationship when a margin setting unit in a modification example sets a safety margin.

FIG. 6 is an exemplary diagram illustrating a distance relationship when the margin setting unit 145 in a modification example sets a safety margin. As illustrated in FIG. 6, in a case where the distance between the obstacles is equal to or longer than 5500 mm, the margin setting unit 145 sets the distance from the front surface, rear surface, and the side surfaces of the vehicle 1 to 300 mm as a normal safety margin. In accordance with the shortening of distance between the obstacles from 5500 mm to 4500 mm, the margin setting unit 145 sets the distance in such a manner that the distance of 300 mm from the front surface, and rear surface of the vehicle 1 is shortened to 200 mm as a safety margin. Then, in a case where the distance between the obstacles is equal to or shorter than 4500 mm, the margin setting unit 145 in the modification example sets the reference distance from the front surface and the rear surface of the vehicle 1 to 200 mm as a second safety margin. The description of a case where the margin setting unit 145 sets the reference distance from the side surfaces of the vehicle 1 will be omitted since the processing is similar to the description described above except the point that the reference distance 200 mm from the front surface and the rear surface of the vehicle 1 is changed to the reference distance 100 mm.

Returning to the first embodiment, a reason why the safety margin in a case where the predetermined condition is satisfied is set equal to or longer than the second reference distance of 200 mm from the front surface and the rear surface of the vehicle 1 will be described. On the vehicle 1 in the present embodiment, an emergency brake system is mounted such that an emergency brake can be applied in a case where the distance between the vehicle 1 and the obstacle is detected to be close by the distance measuring units 16 and 17 during the travelling of the vehicle 1.

In the present embodiment, in a case where the speed of the vehicle 1 under the automatic guidance control is equal to or lower than a predetermined speed (for example, a speed in a case of creep travelling, and equal to or lower than 10 km/s), and in a case where a distance to an obstacle detected in the forwarding direction of the vehicle 1 is closer than 200 mm, the emergency brake operates. In this way, a collision between the obstacle and the vehicle 1 can be suppressed. In other words, the second reference distance in the present embodiment is set as a distance that is a reference in which at least the vehicle 1 does not come in contact with the obstacle when the vehicle 1 travels at the predetermined speed (for example, the speed in a case of creep travelling, and equal to or lower than 10 km/s) and in a case where the emergency brake is applied. Accordingly, for example, both the controlling of the emergency brake and securing of the movement region can be achieved, and thus, the driving assistance can easily be performed.

Figure 7:
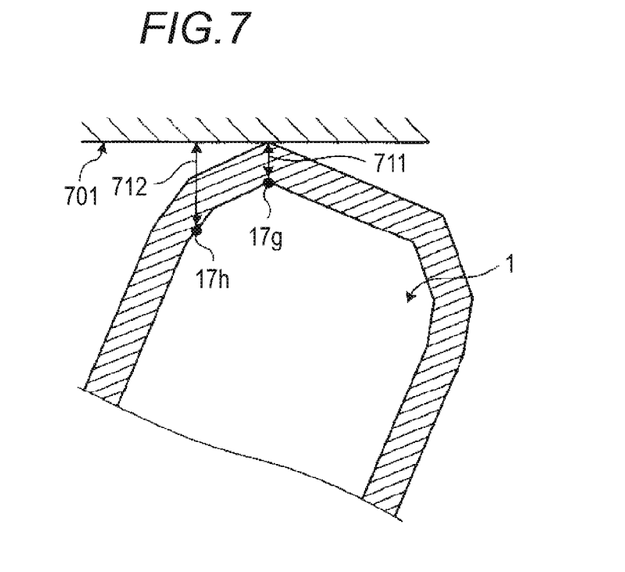
FIG. 7 is an exemplary diagram illustrating a positional relationship between the vehicle in the embodiment and the obstacle in a longitudinal direction.

FIG. 7 is an exemplary diagram illustrating a positional relationship between the vehicle 1 in the present embodiment and an obstacle in a longitudinal direction. As illustrated in FIG. 7, at the time of the automatic guidance control, in a case where the distances 711 and 712 between the distance measuring units 17g and 17h provided on the vehicle 1 and the obstacle 701 in the longitudinal direction is shorter than 200 mm, the emergency brake is applied. In other words, only in a case where the distance to the obstacle in the longitudinal direction is equal to or longer than 200 mm, the obstacle is not included in the second safety margin, and thus, the guidance route in which the emergency brake is not applied can be set.

On the other hand, the third reference distance from the side surfaces is set to 100 mm as the second safety margin of the vehicle 1 in the present embodiment. The reason is because the side surface direction of the vehicle 1 is not the forwarding direction of the vehicle 1 such as the front surface direction or the rear surface of the vehicle 1, and thus, the reference distance may be set shorter than the second reference distance 200.

In the present embodiment, when changing the safety margin, it is not limited to change all of the reference distances in the directions of the front surface, rear surface, and the side surfaces of the vehicle 1. According to the position or the like of the obstacle, the reference distance with regard to any one of the directions of the front surface, rear surface, and the side surfaces of the vehicle 1 may be changed. In addition, in the example illustrated in FIG. 5, the case of side-by-side parking is described, and the safety margin may be set in a case of parallel parking.

Figure 8:
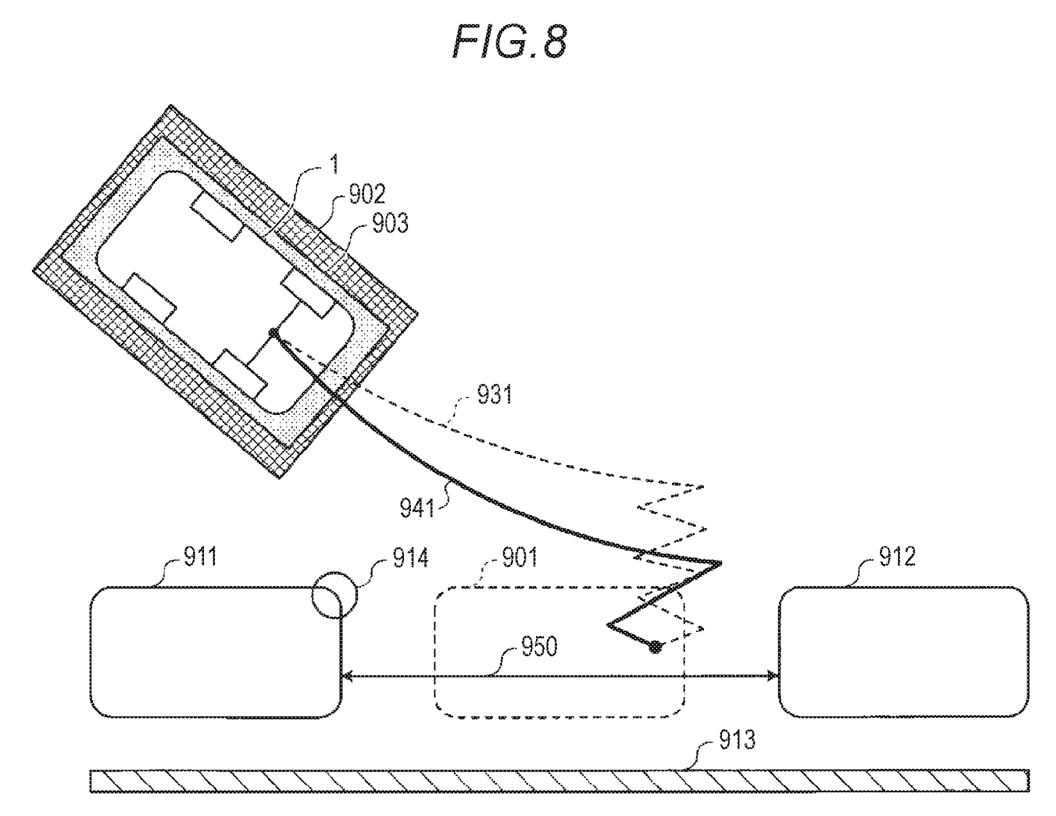
FIG. 8 is a conceptual diagram illustrating a positional relationship between the vehicle and the obstacle in a case where the vehicle in the embodiment is parallel parked.

FIG. 8n is a conceptual diagram illustrating a positional relationship between the vehicle 1 and an obstacle in a case where the vehicle 1 in the embodiment is parallel parked. FIG. 8 illustrates the positional relationship when the vehicle 1 is parked in the target position 901. The obstacles illustrated in FIG. 8 are other vehicles 911 and 912 being present on both sides of the target position 901 and a depth-side wall 913.

Then, the inter-obstacles distance calculation unit 144 calculates a distance 950 between the vehicle 911 and the vehicle 912. Then, the margin setting unit 145 sets the safety margin based on the calculated distance 950.

Assuming a case where the reference distance of 300 mm is set as the safety margin with regard to the directions of front surface, rear surface, and the side surfaces of the vehicle 1, when the vehicle performs the forward and backward turning while securing the safety margin equal to or longer than 300 mm between the vehicle 1 and an end portion 914, since the vehicle 1 is interposed between the vehicle 911 and the vehicle 912, the route setting unit 146 generates a guidance route 931 to the target position 901 in a state in that the moving distance in the longitudinal direction is short. However, the number of forward and backward turnings is large and comfort deteriorates in the guidance route 931.

Therefore, in the example illustrated in FIG. 8, the margin setting unit 145 changes the second safety margin to the second reference distance of 200 mm with regard to the front surface direction and the rear surface of the vehicle 1, and to the third reference distance of 100 mm with regard to the direction of side surfaces of the vehicle 1. In this case, it is preferable that the safety margin between the vehicle 1 and the end portion 914 is equal to or longer the 100 mm. Moreover, since it is preferable that the rear surface or the front surface of the vehicle 1 separated from the vehicle 911 or the vehicle 912 by equal to or longer than a distance of 200 mm, the moving distance in the longitudinal direction becomes longer compared to the case where the first reference distance is 300 mm. Therefore, the route setting unit 146 generates a guidance route 941 to the target position 901. The number of forward and backward turnings in this guidance route 941 is reduced compared to that of the guidance route 931. Furthermore, since the moving route is short, the comfort can be improved.

In the present embodiment, the case of adjusting the safety margin according to a width (distance) between other vehicles is described. However, the obstacle is not limited to the vehicles, and may be a fence or a wall that specifies the road width. In other words, in the present embodiment, the safety margin may be changed in a case where the vehicle is moving on the narrow road.

In addition, in the embodiment described above, the case of decreasing the safety margin as the change of safety margin is described. However, it is not limited to the case of decreasing the safety margin, and the margin setting unit 145 may perform the control of increasing the safety margin according to a condition. For example, in a case where it is determined that the road width is wide or the distance between the obstacles is long, the margin setting unit 145 may change the safety margin to 400 mm.

For example, in a case where the parallel parking of the vehicle 1 is performed, and in a case where the distance between the obstacles calculated by the inter-obstacles distance calculation unit 144 is shorter than the "length of the vehicle 1+1700 mm", the margin setting unit 145 performs the adjustment of decreasing the safety margin. In addition, in a case where the distance between the obstacles calculated by the inter-obstacles distance calculation unit 144 is longer than the "length of the vehicle 1+2000 mm", the margin setting unit 145 may perform the adjustment of increasing the safety margin.

Returning to FIG. 4, the guidance control unit 147 controls each unit such that the moving of the vehicle 1 along the calculated guidance route can be realized. In a case where the vehicle 1 moves by creeping even when the accelerator pedal is not operated, the guidance control unit 147 can cause the vehicle 1 to move along the guidance route by controlling the steering system 13 according to the position of the vehicle 1. In addition, the guidance control unit 147 may control not only the steering system 13 but also a drive mechanism such as an engine or a motor, and a brake mechanism such as the brake system 18. In addition, the guidance control unit 147 may guide the driver to move the vehicle 1 along the guidance route using a display output or a voice output according the position of the vehicle 1 by controlling, for example, the display control unit 14d and the voice control unit 14e, and eventually, the display device 8 and the voice output device 9.

The storage unit 150 stores the data used in the calculation by the ECU 14 or the data resulting from the calculation by the ECU 14.

Figure 9:
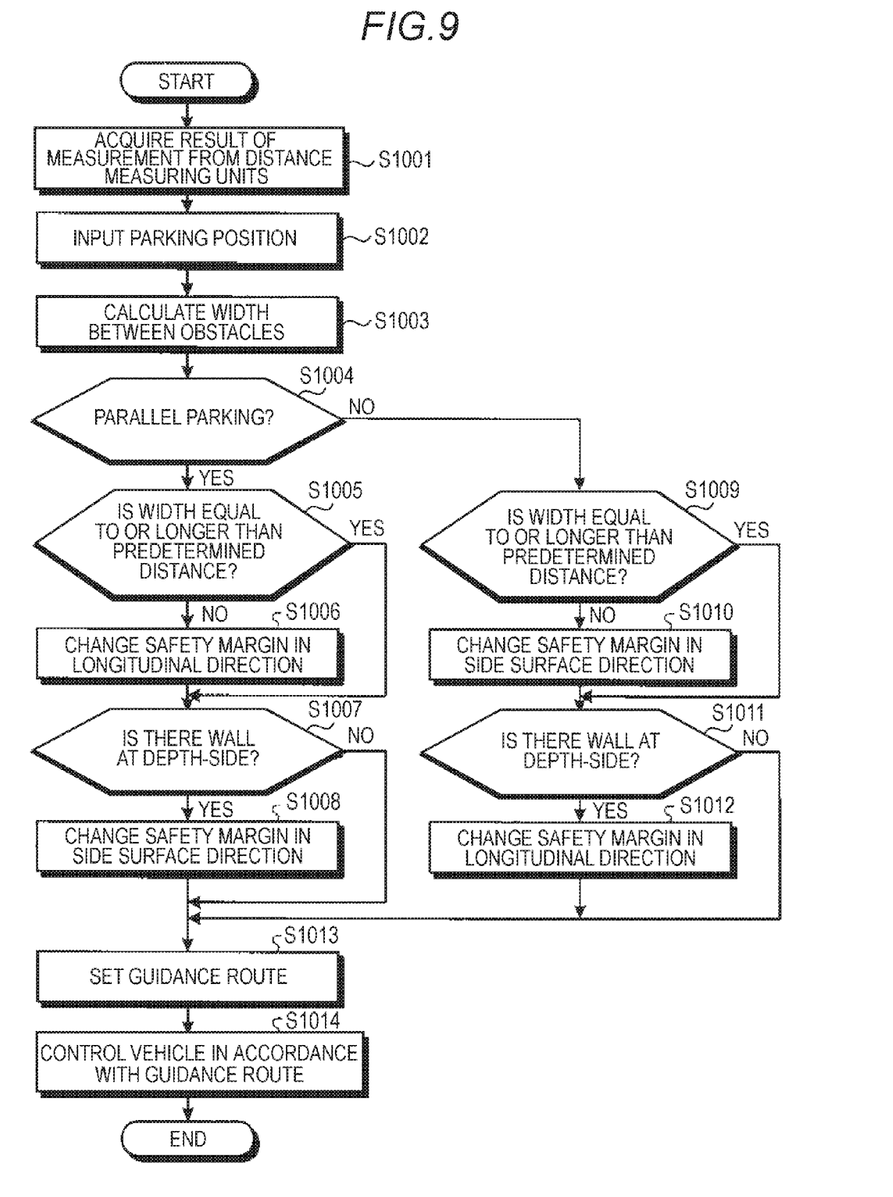
FIG. 9 is a flowchart illustrating a procedure of the guidance processing of the vehicle in the parking assistance system in the embodiment.

Next, guidance processing of the vehicle 1 by the parking assistance system 100 in the present embodiment will be described. FIG. 9 is a flowchart illustrating a procedure of the processing described above in the parking assistance system 100 in the embodiment.

In the flowchart illustrated in FIG. 9, it is assumed that the margin setting unit 145 can switch the safety margin with regard to any one or more directions among the front direction, rear direction and side directions of the vehicle 1. Then, the route setting unit 146 sets the guidance route according to the safety margin obtained by switching.

First, the acquisition unit 141 acquires the result of detection from the distance measuring units 16 and 17 of the vehicle 1 (STEP S1001).

Next, the target position determination unit 143 determines the target position (STEP S1002). For example, the target position is assumed to be a parking position or the like input according to the operation by the driver. As another example, the target position may be a parking position specified by a result of analysis of imaged image data imaged by the imaging unit 15c.

Next, the inter-obstacles distance calculation unit 144 calculates the width (distance) between the obstacles to the parking position (STEP S1003). Then, the target position determination unit 143 determines whether or not to perform the parallel parking at the target position (STEP S1004).

In a case where the parallel parking is determined to be performed (Yes in STEP S1004), the target position determination unit 143 determines whether the width (distance) between the obstacles is equal to or longer than the first predetermined distance (STEP S1005). The first predetermined distance is assumed to be determined based on the length of the vehicle 1. In a case where it is determined that the width (distance) between the obstacles is equal to or longer than the first predetermined distance (Yes in STEP S1005), no particular processing is performed. In a case where it is determined that the width (distance) between the obstacles is equal to or longer than the first predetermined distance, the margin setting unit 145 may perform the control to increase the safety margin.

On the other hand, in a case where it is determined that the width (distance) between the obstacles is shorter than the first predetermined distance (No in STEP S1005), the margin setting unit 145 performs the change to make the safety margin in the longitudinal direction (the front surface direction and the rear surface direction) be short (STEP S1006).

Subsequently, the margin setting unit 145 determines whether there is a wall at the depth-side of the target position or not (STEP S1007). In a case where it is determined that there is no wall (No in STEP S1007), no particular processing is performed. On the other hand, in a case where it is determined that there is a wall (Yes in STEP S1007), the margin setting unit 145 performs the change to make the safety margin in the side surface direction be short (STEP S1008).

On the other hand, in a case where not the parallel parking, in other words, the side-by-side parking is determined to be performed (No in STEP S1004), the target position determination unit 143 determines whether the width (distance) between the obstacles is equal to or longer than a second predetermined distance (STEP S1009). The second predetermined distance is determined based on the width of the vehicle 1. In a case where it is determined that the width (distance) between the obstacles is equal to or longer than the second predetermined distance (Yes in STEP S1009), no particular processing is performed. In a case where it is determined that the width (distance) between the obstacles is equal to or longer than the second predetermined distance, the margin setting unit 145 may perform the control to increase the safety margin.

On the other hand, in a case where it is determined that the width (distance) between the obstacles is shorter than the second predetermined distance (No in STEP S1009), the margin setting unit 145 performs the change to make the safety margin in the side surface direction be short (STEP S1010).

Subsequently, the margin setting unit 145 determines whether there is a wall at the depth-side of the target position or not (STEP S1011). In a case where it is determined that there is no wall (No in STEP S1011), no particular processing is performed. On the other hand, in a case where it is determined that there is a wall at the depth-side of the target position (Yes in STEP S1011), the margin setting unit 145 performs the change to make the safety margin in the longitudinal direction (the front side surface direction and the rear side surface direction) be short (STEP S1012).

Then, the route setting unit 146 generates the guidance route to the target position based on the set second safety margin (STEP S1013).

Then, the guidance control unit 147 controls the vehicle 1 in accordance with the guidance route (STEP S1014).

It is possible to guide the vehicle 1 to the target position while the safety margin of the vehicle 1 is set according to the width between the obstacles (the distance between the obstacles) using the processing procedure described above.

Incidentally, when parallel parking the vehicle 1, in many cases, a plurality of forward and backward turnings of the vehicle 1 is performed, if necessary. In the present embodiment, in a case where the width between the obstacles (the distance between the obstacles) is short, when generating the guidance route, the route setting unit 146 generates the guidance route under the consumption that the vehicle 1 performs stationary steering of the vehicle wheel 3. In this way, it is possible to reduce the number of forward and backward turnings when guiding the vehicle 1 to the target position. However, if the stationary steering of the vehicle wheel 3 is performed, a burden on the steering mechanism increases.

Incidentally, in a case where the change is performed to make the safety margin be short as in the vehicle 1 in the present embodiment, the movable distance between the obstacles becomes long.

Figure 10:
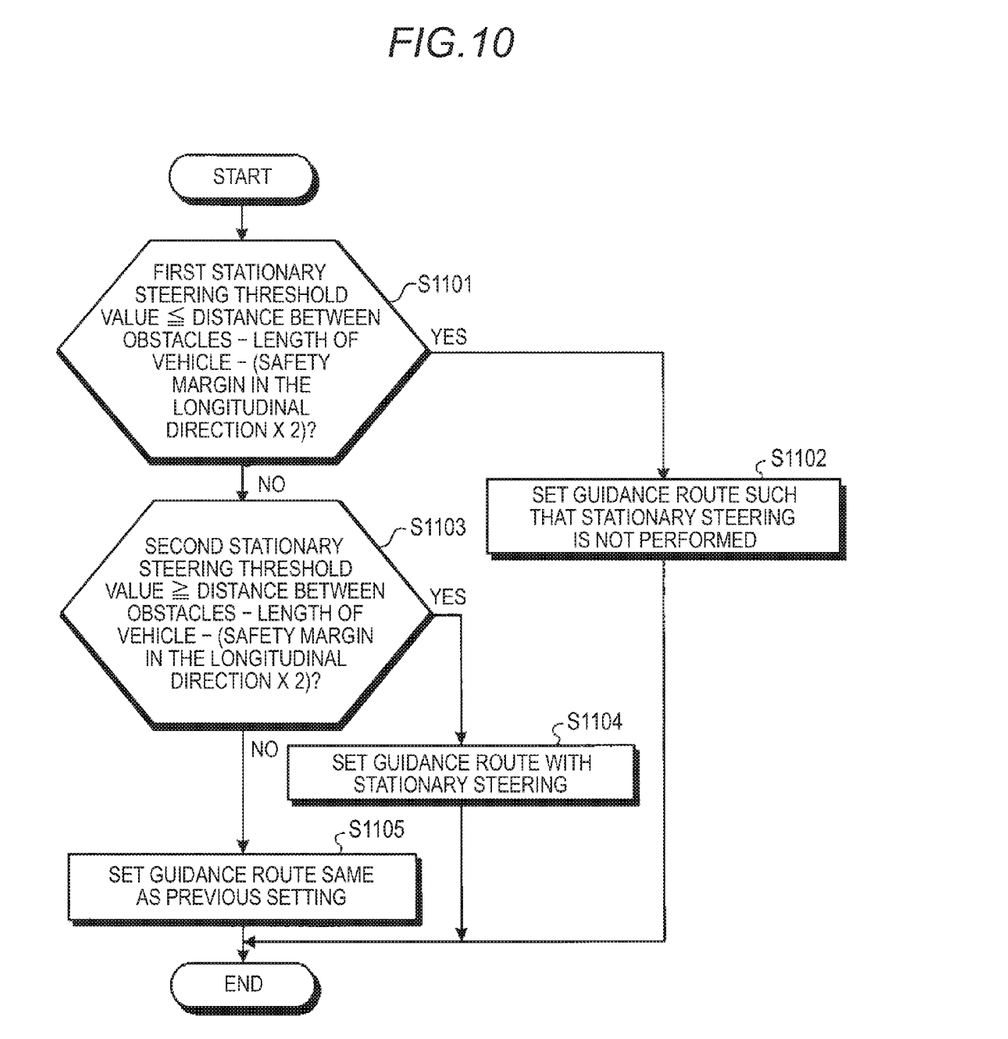
FIG. 10 is a flowchart illustrating a processing procedure of generating a guidance route by a route setting unit in the embodiment at the time of parallel parking.

Next, processing procedure when generating the guidance route in a case of parallel parking in the route setting unit 146 in the present embodiment will be described. FIG. 10 is a diagram illustrating the processing procedure described above in the route setting unit 146 in the present embodiment.

First, the route setting unit 146 determines whether or not an equation "first stationary steering threshold value≤distance between the obstacles−length of the vehicle 1−(safety margin in the longitudinal direction×2)" is satisfied (STEP S1101). In a case where the equation is satisfied (Yes in STEP S1101), the route setting unit 146 sets the guidance route such that the stationary steering is not performed up to the parking position (STEP S1102).

For example, the first stationary steering threshold value is assumed to be 1800 mm. Then, in a case of performing the parallel parking of the vehicle 1, the route setting unit 146 generates the guidance route such that the stationary steering is not performed in a case where the "distance between the obstacles−length of the vehicle 1−(safety margin in the longitudinal direction×2)" is greater than 1800 mm.

On the other hand, in a case where the equation "first stationary steering threshold value≤distance between the obstacles−length of the vehicle 1−(safety margin in the longitudinal direction×2)" is not satisfied (No in STEP S1101), the route setting unit 146 further determines whether or not an equation "second stationary steering threshold value≥distance between the obstacles−length of the vehicle 1−(safety margin in the longitudinal direction× 2)" is satisfied (STEP S1103). The value of the second stationary steering threshold value is assumed to be smaller than that of the first stationary steering threshold value.

For example, the second stationary steering threshold value is assumed to be 1200 mm. Then, in a case of performing the parallel parking of the vehicle 1, the route setting unit 146 generates the guidance route such that the stationary steering is performed in a case where the "distance between the obstacles−length of the vehicle 1−(safety margin in the longitudinal direction×2)" is smaller than 1200 mm.

In a case where the route setting unit 146 determines that the equation "second stationary steering threshold value≥distance between the obstacles−length of the vehicle 1−(safety margin in the longitudinal direction×2)" is satisfied (Yes in STEP S1103), the route setting unit 146 sets the guidance route under the assumption of the stationary steering up to the parking position (STEP S1104).

In a case where the route setting unit 146 determines that the equation "second stationary steering threshold value≥distance between the obstacles−length of the vehicle 1−(safety margin in the longitudinal direction×2)" is not satisfied (No in STEP S1103), the route setting unit 146 sets the guidance route same as the previous setting (STEP S1105).

In the present embodiment, it is determined whether the stationary steering is performed or not based on the equations described above, and then, the guidance route is set based on the result of the determination. In the equation described above, whether or not to perform the stationary steering is determined while considering the safety margin of the vehicle 1. Therefore, it is possible set an appropriate guidance route even in a case where the safety margin is changed.

In the parking assistance system 100 in the embodiment described above, the safety margin is adjusted according to the conditions, and thus, it is possible to secure the movement region for generating the guidance route when the vehicle is moving on a narrow parking space or on a narrow road. In this way, the driving assistance can easily be performed.

Some embodiments according to this disclosure are described, and those embodiments are presented as examples, and it is not intended to limit the scope of this disclosure. These new embodiments can be embodied in various other aspects, and various omissions, substitutions, changes can be performed without departing from the scope of the invention. These embodiments or the modifications can be included in the range or scope of the invention and also included in the aspects of the invention and the equivalent range thereof.

A note will be disclosed with regard to the embodiment described above.

(Note)

The condition for the generation units to perform the generation may be a case where the vehicle travels at a speed equal to or lower than a predetermined speed.

A parking assistance device according to an embodiment includes: for example, an acquisition unit that acquires a first distance between a vehicle and a first obstacle measured by a distance measuring unit and a second distance between the vehicle and a second obstacle measured by the distance measuring unit; a calculation unit that calculates an inter-objects distance between the first obstacle and the second obstacle; and a generation unit that generates a guidance route for the vehicle such that each of the first distance and the second distance acquired by the acquisition unit become equal to or longer than a second reference distance which is shorter than a first reference distance that is a reference for safe travelling of the vehicle, when the vehicle is caused to move between the first obstacle and the second obstacle and within the inter-objects distance and in a case where a condition is satisfied. Accordingly, for example, when the vehicle is caused to move between a vehicle and a plurality of obstacles, the guidance route is generated in such a manner that the distance between the vehicle and the obstacle becomes equal to or longer than the second reference distance which is shorter than the first reference distance, it is possible to easily secure a movement region of the vehicle, and thus, the driving assistance can easily be performed.

In addition, in the parking assistance device described above, for example, in a case where an emergency brake is applied to the vehicle, the second reference distance may be at least equal to or longer than a distance between the vehicle and the obstacle determined as a reference in which the vehicle does not come into contact with the obstacle. Accordingly, for example, both the control of the emergency brake and securing of the movement region can be achieved, and thus, the driving assistance can easily be performed.

In addition, in the parking assistance device described above, for example, the generation unit may generate the guidance route for the vehicle in such a manner that any one of the first distance and the second distance from any one or more directions among a front direction, a rear direction, and a side direction of the vehicle may become equal to or longer than the second reference distance. Accordingly, since the guidance route is generated according to the situation of the vehicle, the driving assistance can easily be performed.

In addition, in the parking assistance device described above, for example, the condition when the generation unit performs the generation may be a case where a difference between the inter-objects distance and a length of the vehicle in a direction connecting the first obstacle and the second obstacle when the vehicle moves between the first obstacle and the second obstacle, is equal to or shorter than a predetermined threshold value. Accordingly, for example, in a case where a relationship between the inter-objects distance and the length of the vehicle satisfies the condition, since the guidance route for the vehicle is generated in such a manner that each of the first distance and the second distance becomes equal to or longer than the second reference distance which is shorter than the first reference distance, the guidance route in a case where the inter-objects distance is short can easily be generated, and thus, the driving assistance can easily be performed.

In addition, in the parking assistance device described above, for example, in a case where the vehicle is not caused to move between the first obstacle and the second obstacle and is within the inter-objects distance or in a case where the condition is not satisfied, the generation unit may generate the guidance route for the vehicle in such a manner that each of the first distance and the second distance become equal to or longer than the first reference distance. Accordingly, for example, since the reference distance can be changed according to the situation, both safety and generation of the guidance route according to the situation can be achieved, and thus, the driving assistance can easily be performed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assistance device comprising:
an acquisition unit that acquires a first distance between a vehicle and a first obstacle measured by a distance measuring unit and a second distance between the vehicle and a second obstacle measured by the distance measuring unit;
a calculation unit that calculates an inter-objects distance between the first obstacle and the second obstacle; and
a generation unit that generates a guidance route for the vehicle such that each of the first distance and the second distance acquired by the acquisition unit become equal to or longer than a second reference distance which is shorter than a first reference distance that is a reference for safe travelling of the vehicle, when the vehicle is caused to move between the first obstacle and the second obstacle and within the inter-objects distance and in a case where a condition is satisfied,
wherein the generation unit performs the generation in response to a difference between the inter-objects distance and a length of the vehicle in a direction connecting the first obstacle and the second obstacle when the vehicle moves between the first obstacle and the second obstacle being equal to or less than a predetermined threshold value.

2. The parking assistance device according to claim 1, wherein, in a case where an emergency brake is applied to the vehicle, the second reference distance is at least equal to or longer than a distance between the vehicle and the obstacle determined as a reference in which the vehicle does not come into contact with the obstacle.

3. The parking assistance device according to claim 1, wherein the generation unit generates the guidance route for the vehicle in such a manner that any one of the first distance and the second distance from any one or more directions among a front direction, a rear direction, and a side direction of the vehicle becomes equal to or longer than the second reference distance.

4. The parking assistance device according to claim 1, wherein, in a case where the vehicle is not caused to move between the first obstacle and the second obstacle and within the inter-objects distance or in a case where the condition is not satisfied, the generation unit generates the guidance route for the vehicle in such a manner that each of the first distance and the second distance become equal to or longer than the first reference distance.

5. The parking assistance device according to claim 1, wherein the threshold value is set using the first reference distance.

* * * * *